May 28, 1946.    G. B. CROUSE ET AL    2,401,051
PHOTOGRAPHIC EMULSIONS AND METHODS
Filed Sept. 26, 1939

INVENTORS:
George B. Crouse
Jacob L. Jatlow
BY Francis A. Holt
E. C. Sanborn
their ATTORNEY Patented May 28, 1946

2,401,051

UNITED STATES PATENT OFFICE 2,401,051

PHOTOGRAPHIC EMULSIONS AND METHODS

George B. Crouse, East Setauket, Francis A. Holt, Port Jefferson, and Jacob L. Jatlow, New York, N. Y., assignors to Photo-Positive Corporation, New York, N. Y., a corporation of New York Application September 26, 1939, Serial No. 296,536

11 Claims. (Cl. 95—7)

Our present invention concerns light sensitive emulsion layers or coatings for photographic plates, films, paper or the like, which upon proper exposure and first development, give direct positive pictures of the object.

The present-day art of photographing, that is, "taking pictures," depends largely upon the use of salts which turn dark when exposed to light and then "developed," and the greater the amount of light, the darker the effect. The result is a "negative" from which a positive, or real picture may be produced by a number of well known methods. Our present invention is the result of discoveries we have made whereby light-sensitive salts may be used to produce direct positives.

The above and other facts with respect to our invention, and the nature and objects thereof, may be better understood from the following description in connection with the accompanying drawing, in which Figs. 1, 2, and 3 are "curve sheets," in all of which the abscissae represent the log exposure, i. e., log (10) (light intensity × time); the ordinates represent density of the image; and the curves represent exposures and resulting densities characteristic of certain emulsions hereinafter referred to.

In the usual emulsion layers, the light-sensitive elements are minute grains or crystals of silver halides, such as silver bromide, suspended in gelatin or the like. Upon exposure within the normal limits indicated by the curve between 1 and 2, Fig. 1, some of these grains, to a depth and in numbers proportional to the time and intensity of the light falling on them, are changed to form an invisible "latent image" in and among the unchanged grains.

This invisible image is potentially a "negative" and, in ordinary photography, this invisible negative is subjected to the action of a "developer" solution, whereby the minute light-affected grains are reduced to minute particles of metallic silver which appear black and, by contrast with the lighter unchanged parts of the layer, they constitute a visible negative image of the object from which the light was projected. Then said lighter, unchanged crystals are dissolved out in a "fixing" solution, and the dark silver image remains as a deposit on the surface of the plate, film or paper support. The latter is then the ordinary "negative" in which light parts of the object appear as shadows, and the shadows as high lights.

The ordinary way of getting a positive picture is to "print" the negative on a second light-sensitive emulsion paper, plate or film, using the negative as a transparency. The greater light projected through the more transparent parts of the negative will print shadows and the less light through the denser parts will print the higher lights.

There are also "indirect reversal processes" that depend upon exposing and developing the ordinary negative; then, instead of dissolving the unexposed grains as usual, the negative image itself is dissolved, leaving only said unexposed grains. These unexposed grains correspond to the high lights and low lights of the original object, and the positive is produced by giving these unexposed grains a uniform all-over exposure, and then developing and fixing them, in the ordinary way. This method requires a specially thin and uniform emulsion layer and the processing requires very precise control, but it has been used as an indirect method of processing motion picture films for amateurs.

The above indirect methods have no bearing on our invention, because they require production of a good negative, as the basis for subsequent treatment to produce the positive picture.

Other methods, which do not require production of a negative, are those depending on "Herschel effect." According to these methods, the production of the negative image is minimized or prevented by initially fogging the emulsion. The fogging should be sufficient to produce, upon development, a density equal to the greatest density required in the finished picture, that is, to or near the point 2, Fig. 1, the fogging being produced either by all-over uniform pre-exposure to white light, or by chemically fogging the emulsion during manufacture. The thus fogged plate is then used to take pictures by exposure in the usual way, but the positive, the "Herschel effect," depends on using a filter that admits only light of long wave length, usually red light. The exposure required to produce the Herschel effect is, however, so great as to preclude ordinary practical uses of these methods.

The "solarization" effects to which our invention relates, resemble the "Herschel" effects in some ways, but differ from them in several vitally important particulars. They are similar in that a negative of the object is not necessary, so the emulsions may be prepared with a view solely to getting the best positive-producing conditions. As concerns the normal range of negative exposure, from 1 to 2, Figs. 1 and 2, we may have our emulsions fogged or pre-exposed to or near maximum density of a negative, as for red light Herschel effects, but this is entirely unnecessary. They may be clear and unfogged or they may be partially fogged, either purposely or as an incident to making good positive emulsions. The point is that while our discoveries concern making emulsions that will be best for speed, density and contrast in making direct positives, we prefer not to avail ourselves of all the permissible maximum fog. One reason is that with less primary fog, there is more latitude for all-over exposure of part or all of the positive latent image, to whatever extent may be desirable, either for softening contrast or for standardizing the density of one positive with respect to other pictures with which it may be associated, as in photogravure.

A difference of even greater importance is that instead of being limited to red light for our exposures, we expose to all light from the object regardless of wave length, and our emulsions are sensitive to the blue and violet rays, like ordinary negative emulsions.

The "solarization" effect has been known as a result of gross over-exposure of a negative-producing film or plate, namely, when the emulsion is developed the resulting image is a positive instead of a negative. During this exposure, the light first produces the usual invisible negative, and its developable density increases to the maximum of which that emulsion is capable, as indicated by the curve between 1 and 2, Fig. 1. When the high light portions of the negative reach that maximum density, any further exposure as indicated by the line 2—2x, Fig. 1, cannot produce any substantial increase above said already attained maximum. Thereafter, continued exposure operates to bring the weaker-light shadow portions, up to the same maximum density, one after the other. With ordinary negative-producing emulsions the entire negative is eventually brought to maximum density and if developed it would appear uniformly black all over. But if the over-exposure is continued long enough before development, usually thousands of times longer than necessary to produce the ordinary negative, the light will have a reversing effect on some of the crystals or grains constituting the now uniformly-dense, latent-image negative as indicated at 3, Fig. 1; that is to say, some of those of the already exposed crystals that are sufficiently acted on by the light will be changed back again to their original condition to such an extent that, like unexposed crystals, they will not be affected by the "developer," and remaining soluble will be washed out in the fixing bath. The number of crystals thus reversed and washed out will be greater according as the amounts of light received from different parts of the object are greater; so the washed out parts will correspond to the high lights of the object. The unreversed crystals are what is left of the previously uniform latent-image after subtracting the reversed crystals that correspond to the high lights, so when the emulsion is developed to change these latent-image remnants to the real image, and the reversed crystals corresponding to the high lights from the object have been washed out, said real image remains as shadows and the washed out parts as high lights of a directly produced positive picture.

Such reversal effects obtainable by "solarization" exposure of ordinary negatives, are wholly unsatisfactory for practical purposes, because the time of exposure required to produce them is enormously greater, sometimes thousands of times greater, than the exposure required to produce the ordinary negative; and the density range and contrast effects in the final positive picture are much too far below commercial standards.

Our invention enables the production of emulsions capable of solarization upon relatively short exposure to ordinary white light, and, through intensive study and investigation, we have produced emulsions which may be solarized to produce positives by exposure to white light, in as short or shorter time than that required for ordinary commercial copying emulsions that produce only negatives.

Figure 2:
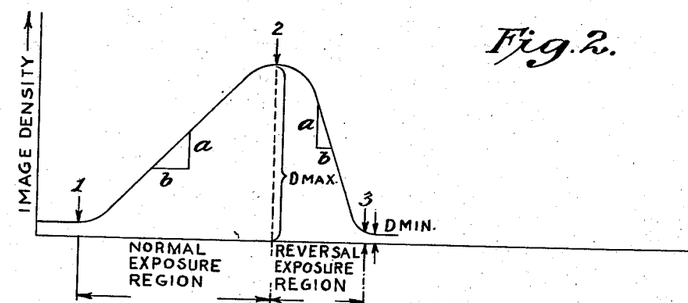

This is indicated by the legends on Fig. 2, where the "reversal exposure" curve 2—3 shows the decreasing densities that result in a positive picture, and the "normal exposure" curve 1—2 shows the increasing densities that result in a negative.

In this connection, it is to be noted that when our emulsions are entirely unfogged as we prefer to have them, or partly fogged, as they may be when we use speed-increasing sensitizers, the first part of the exposure as indicated by the curves 1—2, Fig. 2, will result in production of a negative which will be more or less perfect according to the degree of the fog. At the time when the high lights in the negative reach maximum density, indicated at the peak 2, the lower lights are of the lower densities indicated along the curve at the left of said peak, corresponding to the lesser intensities of the light from the lower light portions of the object. In other words, for the shadows where the light is less intense, the time required to reach maximum density is necessarily longer than for the high lights. With our preferred high speed emulsions properly exposed, the highest lights from the object will reach maximum density and begin to reverse as indicated in the region at 2, Fig. 2, before the successively lesser lights representing the shadows reach maximum density and commence to reverse, and reversal of the crystals corresponding to said lesser lights will commence only after correspondingly greater lengths of time. This is as it should be, because the more intense the light, the greater will be the number of maximum density crystals that must be reversed and made soluble so as to be dissolved out and leave the proper low densities necessary for a proper positive picture of the high-light parts of the object, when the layer is developed and fixed.

From the above, it may be seen that specific objects of our invention include the production of direct positive emulsions having speed, density range and contrast equal or superior to the standard negative-producing emulsions now commonly employed for copying, enlarging, etc.

Some of the advantages of our invention are: (a) After proper exposure, a direct positive results on first development; (b) the cost is no greater than that of a single negative; (c) it may be processed in the same manner and with the same simplicity as the present negative emulsion; (d) for copying, a positive is always desirable and sometimes essential; (e) emulsions having widely different speed and contrast characteristics may be prepared for different purposes; and (f) with any given emulsion, contrast may be controlled in a considerable degree by varying the exposure, and this is not only an advantage in itself, but permits images of different degrees of contrast to be developed on the same film or paper.

For the sake of clarity, the following definitions of various terms employed herein are given:

E—exposure—is the product of light intensity (usually stated in terms of meter-candles) and time (usually stated in seconds).

D—density—is the common logarithm of the reciprocal of the transmission of light through the silver deposit.

Transmission is the ratio of the transmitted light to the incident light.

Fog is the density produced by a given development on those portions of the emulsion which have received no exposure to light.

Contrast of an emulsion is generally designated by the Greek symbol "gamma," and it is the tangent of the straight line portion of the curve. In other words, referring to Fig. 2, $$\text{Gamma} = \frac{a}{b} = \frac{d \text{ (density)}}{d \text{ (log E)}}$$

$D_{max}$ is the maximum density developed with a given method of development.

The above definitions apply to both negative emulsions and our direct positive emulsions. For our direct positive emulsions it is necessary to introduce the term:

$D_{min}$=the minimum density obtainable upon prolonged exposure and a given development. In a practical sense this is equivalent to fog in a negative emulsion.

Photographically and chemically considered, the invention has numerous aspects of varying scope and importance. One novel feature is the preferred strongly acid condition of our solutions during formation of the light-sensitive grains in connection with which some of our important discoveries have been originally made. Alkaline precipitations and mildly acid precipitations, have been used in connection with manufacture of ordinary negative-producing emulsion, but we have discovered that with proper acid concentration at the time of precipitation, or first digestion, or both, emulsions which otherwise would be normal, negative-producing emulsions reverse and produce direct positives, when developed after properly prolonged exposure; that the reversal tends to improve as acidity is increased; that with acidity below pH 4.7 good reversing negatives may be produced; and that with acidity pH 3.5 to pH 2.5, highly satisfactory reversing qualities may be produced. We have also found that the acid concentration may be further increased to pH values well below 2.5 until such strength of acid concentration is obtained as results in undesirable reduction of the ratio between maximum and minimum density of the silver deposited on development.

The ratio of maximum to minimum developable density should be at least 4 for most purposes. In other words, it is generally desirable that $$\frac{D_{max}}{D_{min}} \geq 4$$

Emulsions made in accordance with our invention are capable of attaining this and substantially greater density ranges, in addition to marked speed of reversal and desirable contrast as above noted.

Furthermore, from numerous experiments we have formulated certain theories which experience shows can be used as guides governing production of emulsions involving our present invention, which while recognizing and including our acidity discoveries, are broad enough to include a wide range of pH values, higher than any of those above mentioned, and extending into the range of definite alkalinity. Such theories, applicable as guides will be more fully explained hereinafter.

Our methods of making direct positive emulsions in accordance with the present invention, presuppose knowledge and use of the ordinary technique of emulsion making, and in order to understand the present novel variations thereof, it may be noted that practically all photo emulsion coatings involve utilizing certain generic procedures, which will now be briefly described:

Most of the steps are generically the same for either silver chloride or silver bromide negative-producing emulsions. A gelatin solution is prepared by soaking the gelatin in cold water, then heating it and dissolving therein a suitable quantity of ammonium halide, such as chloride or bromide, and the whole kept warm in a water bath.

Precipitation: A solution of silver nitrate is then introduced, with constant stirring, the ammonium halide and silver nitrate reacting to precipitate a silver salt. Ammonium bromide, for instance, will precipitate silver bromide, and form ammonium nitrate which remains in solution. The silver bromide is the potentially light sensitive compound, but at precipitation it is not very sensitive.

First digestion: This is accomplished by heat treating the emulsion for a period which may be as long as several hours. The increase of sensitivity during this process is connected with the solubility of the grain-forming silver bromide in the ammonium bromide, and to increase this solubility, some ammonium bromide additional to that required for the reaction is customarily added before precipitation.

Secondary gelatin: This is usually added after first digestion is completed.

Chilling, shredding and washing: This is for the purpose of freeing the emulsion from the soluble salts, such as the excess ammonium bromide and also the ammonium nitrate formed during precipitation.

The chilling forms a pudding-like gel. Shredding is by forcing the gel through a fish net or wire screen to form a mass of strings. Washing is usually for several hours, in a running stream of tap-water.

"After-ripening," or "second digestion": This is effected by melting the washed emulsion and heat treating it, usually at constant temperature, for a period which is determined empirically. Physically considered, this is like the first digestion, but most of the soluble salts having been removed by the washing, "chemical sensitizers" including those naturally in the gelatin or those specially added, can act to form the usual light-sensitive silver sulphide "nuclei" on or in the silver halide crystals.

Coating. The emulsion is then coated or spread in a thin layer on a suitable support, plate, film or paper, and coating may be facilitated by modifying the consistency of the emulsion, by addition of certain "doctors," that is, photographically inert substances, such as alcohol, saponin, etc.

Many variations in the above materials and steps are common in the art. For instance, slow emulsions used for contact printing, may be made with silver chloride instead of silver bromide; high speed emulsions generally contain a small percentage of silver iodide; halides of the alkaline and certain other metals may be used in place of the ammonium salt; and centrifuging may be employed in lieu of chilling, shredding, and washing.

The steps used in the manufacture of our direct positive emulsions may be generically the same as those above described for the usual negative emulsions, but a novel feature is that the forming of the grains during precipitation and/or first digestion is under conditions favorable to adsorption by the silver halide grains, of halogen or other substance capable of destroying developability of said grains. Such adsorption is aided by having the grain-forming precipitation and first digestion both take place in a solution containing a soluble halide and also electro-positive ions, preferably hydrogen ions, preferably sufficient to make the solutions definitely acid.

The halogen is ordinarily present during precipitation and first digestion in the form of a soluble halide. The electro-positive ions, preferably hydrogen ions, are introduced by adding an acid to the soluble halide solution, preferably before precipitation; or by adding a soluble salt.

Starting with a formula appropriate for the production of good negatives when made up as first above described, but with the addition of acid as above noted, an emulsion may be formed which, unless over-washed or otherwise unfavorably modified by the after-treatment, will have the characteristics shown in Fig. 2. That is to say, if it is exposed in the region marked "normal exposure region," a negative image will result, but if the exposure values lie in the range marked "reversal exposure region," a direct positive will result.

Examples of our emulsions employing acids to supply electro-positive hydrogen ions to acidify the solutions to somewhere around pH 3.5 or lower are as follows:

Formula I

Solution A:
  Gelatin ____________________________ gms__ 20
  Normal hydrochloric acid ___________ ml__ 22.6
  Ammonium chloride _________________ gms__ 2.6
  Water to make _____________________ ml__ 150
Solution B:
  Silver nitrate ____________________ gms__ 3.85
  Water to make _____________________ ml__ 7.7

(1) Heat Solution A to 45 deg. C. and add Solution B, drop by drop, with constant stirring. Time of precipitation, approximately 10 minutes. (2) Digest two hours, at 45 deg. C. (3) Add 1.3 ml. 10% solution neutral chrome alum. (4) Chill, shred and wash with nine baths of five minutes each, water acidified to pH 3 with hydrochloric acid. (5) Second digestion, about 4 hours, at 45 deg. C. (6) "Doctors" such as alcohol, etc., may be added, at this point. (7) Coat to approximate equivalent of 4 gms. metallic silver per square meter.

In this and all of the other formulae herein specified the weight of gelatin referred to is the air-dry weight.

The above is an example of how formulae suitable for non-reversing chloride emulsions, may be modified to impart strong reversing qualities, merely by adding enough hydrochloric acid so that precipitation and first digestion occur in a solution acidified to below pH 4.7.

In the foregoing emulsion the pH was 2.8 during first digestion. The halide concentration before precipitation was .47 molar (including the chlorine derived from the hydrochloric acid). The halide concentration after precipitation and during the first digestion was .31 molar, representing the halide in excess of that which combined with the silver of the silver nitrate to precipitate silver halide. The molar concentrations referred to here and elsewhere throughout this specification are in terms of moles (gram molecules) per liter of the emulsion ingredients. For example, .31 molar means .31 mole per liter. In the case of substances such, for example, as ammonium or potassium halides, the molar concentration, of course, is equal to the normal concentration, the relation between molar and normal concentrations being well understood.

The wash water was acidified so that it contained halogen and hydrogen ions sufficient to prevent reducing the halogen and hydrogen ions in the emulsion below a certain predetermined minimum. This gave greater latitude for longer washing, without danger of impairing the reversal qualities of the finished emulsion.

Such emulsions resemble ordinary chloride emulsions in that if exposed only long enough to produce a negative, the blacks and whites of the image are exceptionally pure and have a wide density range, and the same thing is true of the positives produced by the somewhat longer exposure required for reversal. Reversal speeds may be about the same as for well known "Azo" papers. In the present case, exposure for contact printing a positive was about 1 minute, with a 100 watt lamp, about 18 inches from the paper.

Formula II

Solution A:
  Gelatin ____________________________ gms__ 4
  Normal hydrobromic acid ___________ ml__ 5
  Ammonium bromide __________________ gms__ 12.48
  Water to make _____________________ ml__ 150
Solution B:
  Silver nitrate ____________________ gms__ 10
  Water to make _____________________ ml__ 110
Solution C:
  Ammonium bromide __________________ gms__ 5.76
  Water to make _____________________ ml__ 110

(1) Heat Solution A to 65 deg. C. and Solutions B and C to 70 deg. C. and add, with constant stirring, Solutions B and C, simultaneously, in fine streams, to Solution A. Time of precipitation, approximately five minutes. (2) Digest for two hours, at 55–60 deg. C. (3) Add 36 gms. secondary gelatin, swelled in cold water. (4) Add 4 ml. 10% neutral chrome alum solution. (5) Chill, shred and wash with nine baths, of five minutes each, with water acidified to pH 3 by hydrobromic acid. (6) Digest at 55–60 deg. C. to maximum reversal sensitivity. The digestion time may be as long as ten hours. (7) Add "doctors" if required. (8) Coat to approximate equivalent of 4 gms. metallic silver per square meter The above is an example of a more or less conventional formula for a bromide emulsion, plus acidification as in Formula I, except that for the bromide, the acid is hydrobromic, instead of hydrochloric. Wash water is also acidified, as in the chloride formula. Desirable differences are that in precipitating Solution A the gelatin is greatly decreased, and is preferably only sufficient to suspend the bromide of silver. A further important difference is that the excess ammonium bromide in Formula II is considerably greater than commonly employed in bromide formulae.

The pH of this emulsion was 2.6 during first digestion. The halide concentration was .88 normal before precipitation and .36 normal during first digestion.

The neutral chrome alum was added in the emulsions of Formulae I and II to prevent excessive swelling of the gelatin during washing. However, the neutral chrome alum may be omitted where, as in Formula III, presently to be described, the acid is neutralized after first digestion, or where, as in later formulae (IV and IX), no acid is present. It may also be omitted where the washing is reduced (as in V and VII, later referred to) or where the emulsion (as in subsequent Formulae VI and VIII) is subjected to centrifuging in lieu of washing. Curtailing the amount of washing or raising the pH dispenses with the need of the above-mentioned treatment with neutral chrome alum.

In practical performance, this bromide emulsion seems to have reversing speed and qualities differing from the above chloride reversing emulsion, somewhat as ordinary negative-producing bromide emulsions differ from negative-producing chloride emulsions. In this Formula II, the wash water is acidified to pH 3, for the same reasons as in Formula I.

In formulae like I, and II, merely (1) precipitating in presence of the acid, without first digestion, washing or second digestion; or (2) precipitating without acid and then adding the acid and giving first digestion, will result in an emulsion, which without washing or second digestion, will reverse and produce a direct positive; but (3) having the acid present during both precipitation and first digestion, gives unexpectedly great improvement in reversal qualities of the emulsion without second digestion.

In each of these three special cases, it will be noted that the acidity conditions during precipitation, or first digestion, or both, are favorable for associating the halogen with the silver halide grains in such intimate relation as to make the grains potentially reversible; and, subsequent steps being omitted, there is nothing to disturb this intimate relation, nor the resulting reversal qualities.

In Formula I and Formula II, separation of the soluble salts from the precipitated silver halide by any method which does not excessively denude the grains of such intimately associated material, will greatly improve the quality of the direct positive picture that can be produced, and this may be accomplished by washing in acidified water, as described. Moreover, the acid having served its primary useful function, may be neutralized. The emulsion may then be given limited washing in unacidified water as noted in connection with Formula III, presently to be described.

Second digestion after washing, is desirable, especially in the case of bromide emulsions, as in Formula II, because of its very beneficial effect in modifying reversal contrast and raising maximum obtainable density.

FORMULA III

Solution A:
- Gelatin _________________________ gms__ 2
- Ammonium bromide _____________ gms__ 12.48
- Potassium iodide _________________ gms__ .08
- Normal hydrobromic acid _________ ml__ 5
- Water to make ___________________ ml__ 140

Solution B:
- Silver nitrate ____________________ gms__ 10
- Water to make ___________________ ml__ 110

Solution C:
- Ammonium bromide _____________ gms__ 5.76
- Water to make ___________________ ml__ 110

Solution D:
- Bromine _________________________ gms__ .005
- Water to make ___________________ ml__ 5

(1) Heat Solution A to 65 deg. C., and Solutions B and C to 70 deg. C. and add, with constant stirring, Solutions B and C to A. (2) One minute after precipitation is started, add Solution D rapidly from a pipette. Total time of precipitation, approximately five minutes. (3) Digest for two hours at 55-60 deg. C. (4) Add 38 gms. secondary gelatin, swelled in cold water. (5) Neutralize the acid by adding 5.0 ml. normal potassium hydroxide solution. (6) Chill, shred and wash with nine baths, 5 minutes each, water. (7) Melt and add .017 gm. thiosinamine (allyl thiocarbamide) in about 2 mls. water. (8) Digest at 55-60 deg. C. to maximum reversal sensitivity. This may require 7 to 10 hours. (9) Add "doctors" as required. (10) Coat to approximate equivalent of 4 gms. Metallic silver per square meter.

The above emulsion for direct positives is like that of Formula II, as concerns differences from conventional bromide formulae, but it has other differences. The added iodide is conventional, but using only half as much gelatin during precipitation and adding bromine one minute after precipitation is started have been found to further facilitate and increase the adsorption of bromine in or on the silver bromide crystals, thereby improving reversal qualities.

Another difference is utilization of our discovery of the possibility, and the desirability of neutralizing the acid after adding gelatin; then washing in pure water; and limiting the washing to avoid unduly denuding the halide grains and to create favorable conditions for the thiosinamine. Our .017 gram thiosinamine for 40 grams, dry weight of gelatin, is a ratio of 1 in 2400, as contrasted with 1 in 50,000, which is considered about the limit that can be used in negative-producing emulsions, without producing objectionable fog. We found that even with our 1 in 2400 ratio, the fog density on development without exposure was only about 0.6, measured by the Martens sensitometer; while reversal exposure and development of a positive, shows no fog at all.

An important practical point is that speeds are remarkably increased and its positive-producing reversal speeds lie in the same range as the negative-producing speeds of ordinary bromide papers. This is as fast as could be desired for copying with a camera, projection printing, or similar uses. Even for outdoor camera use, 2 seconds exposure will be sufficient for a good positive if the light is good.

In the emulsion produced according to Formula III as above described the pH was approximately 1.2 during first digestion. The halide concentration was .98 molar before precipitation and .37 molar during first digestion. As above noted, the acid was neutralized after first digestion. The pH during second digestion was 6.1.

The following is a formula for a direct positive emulsion, in which a metal is used in place of the hydrogen during precipitation and first digestion:

FORMULA IV

Solution A:
- Gelatin _________________________ gms__ 2
- Ammonium bromide _____________ gms__ 12.48
- Potassium iodide _________________ gms__ .08
- Nickel chloride (NiCl₂) ___________ gms__ .8
- Water to make ___________________ ml__ 140

Solution B:
    Silver nitrate_________________________gms__  10
    Water to make_________________________ml__  110
Solution C:
    Ammonium bromide ____________________gms__  5.76
    Water to make_________________________ml__  110
Solution D:
    Thiosinamine __________________________gms__  .017
    Water to make (about)_________________ml__  2

For illustrative purposes and direct comparison, the above formula, and its manufacture are closely parallel with Formula III. Consequently, it has the benefit of closely limited washing and other factors favoring adsorption of bromine as described in connection with Formula III, but the positive ions present at precipitation are nickel from the nickel chloride instead of hydrogen from hydrobromic acid, and the emulsion not having been rendered definitely acid by the nickel chloride, it is unnecessary to neutralize by potassium hydroxide, or equivalent.

The resulting emulsion, as made by us, has speed, density range, etc. not so good as Formula III, but better than Formula II.

The pH of the Formula IV emulsion was 6.1 during first digestion. The concentration of halide before precipitation was 1.0 normal and during first digestion was .39 normal.

It will be noted that the four formulae given above, as well as those set forth hereinafter, are by way of illustration and example, and that many variations may be made within the scope of our invention. As an assistance to others in determining other specific formulae within that scope, we will refer to the theories, which we have found useful as guides in applying and extending the principles of our invention to include various other illustrative formulae.

These guides are based on facts, some heretofore established by others, and others of greater present importance established experimentally by ourselves, as follows:

(1) It has been established, by other investigators:

(a) that a photographic emulsion may be regarded as composed of three parts: first, the sensitive silver halide grain; second, a strongly adsorbed layer of gelatin surrounding the grain; and third, the bulk of the gelatin in which the grains are suspended; and it is now generally accepted.

(b) that the latent negative image is a tiny sub-microscopic speck of metallic silver on the surface of each grain, brought about by the photo-chemical reduction of the silver halide and that when acted on by the developer, this speck serves as the vulnerable starting point for complete reduction of the entire grain.

(2) From the evidence, resulting from our numerous tests, we believe that the same things are true of our emulsions so far as concerns producing negatives.

(3) The reversal, that is, the direct positive result, is evidently brought about by light of the same wave lengths that produce the ordinary negative.

(4) Just as the formation of the ordinary negative latent image is an effect of light on each individual grain, independently of the presence or behavior of neighboring grains, so reversal is an effect of light on each individual grain independently of the others.

(5) The reversal is like the negative in that it is not a chemical effect of the developer, but is the effect of light, as is shown by the fact that the direct positive image may be developed by the action of the same kinds of developing solutions which produce ordinary negatives; and which may be used to produce negatives in our emulsions when not exposed enough to produce reversal.

(6) Unlike ordinary negative emulsions, our direct positive bromide emulsions will build up very little density for either a positive or a negative, when exposed and developed immediately after washing; second digestion greatly increases the possible maximum density particularly for bromide emulsions.

(7) An indication as to how the continued action of light operates to reverse the grain, is based on the fact that the free halogens attack finely dispersed metallic silver with the formation of the halide of silver and that this action takes place more energetically in the presence of hydrogen ions.

In view of the above and many other facts and discoveries, we have formulated certain working hypotheses which have served us as guides for varying conditions and constituents so as to get the best results, particularly as concerns speed, density range, contrast, etc.

(A) When the silver halide grain is precipitated in the presence of halogen ions, or is digested in the presence of these ions, the halogen becomes intimately associated with the grain, probably by adsorption, or solid solution. It may be adsorbed to the surface of the grain, or to the surfaces of the tiny mosaics of which the crystal is made up; and where acid is used, it may be that hydrogen is actually substituted for silver at certain lattice points in the completed crystal. It is not necessary to be more specific about it, and we shall use the term "adsorption" to cover any of these cases where halogen and hydrogen or other ions are intimately associated with the silver halide and in or adjacent to each crystal, as distinct from and additional to that which may be diffused in the gelatin.

(B) After first digestion, when (as in Formula III) the concentration of the hydrogen in the bulk of the gelatin is reduced by neutralizing, and the concentration of bromine is reduced by washing, remnants of both hydrogen and bromine are retained by the adsorbed layer of gelatin surrounding the crystal; but the grain, including the crystal and said adsorbed layer, remains substantially insensitive to light, and, at this stage, a layer of the emulsion will not build up density even after prolonged exposure. As fast as the light acts to form the latent image silver speck in or on one of the grains, the bromine and hydrogen retained in the adsorbed layer of gelatin attack the silver speck and reconvert it into silver bromide.

(C) The above reaction which nullifies the speck forming reaction during first digestion, is modified during second digestion by two simultaneous processes. The layer of adsorbed gelatin, and possibly the extreme outer shell of the crystal itself, is slowly denuded of most of its adsorbed reversing material by diffusion and consequent dilution thereof throughout the bulk of the gelatin; while at the same time the emulsion gains in normal sensitivity by formation of the usual silver sulphide specks that constitute the sensitivity nuclei. As a result of these two processes during second digestion, the emulsion gains in both normal and reversal speed and in the ability to build up density in the properly exposed regions.

(D) As a result, the silver speck-forming and silver speck-reducing effects that were simultaneous during first digestion, are rendered separable and successive by second digestion. That is to say, upon exposure of our reversing emulsions, we conceive that the negative latent image speck is first formed in the ordinary way, and it will cause the grain to be developable as a negative if the exposure is not carried beyond this point. As the light continues to act, however, the size of the latent image speck will increase. The silver bromide grain is necessarily partially decomposed to increase the metallic silver in the speck, thereby liberating bromine, and both bromine and other ions are liberated from the material adsorbed in or on the grain. As the latent image speck is thus increased, a point is reached where the displaced but closely adjacent bromine becomes sufficiently concentrated to attack the silver speck and reverse it back to silver bromide. This new bromide formed in this new way is a "reversal" in some respects but not in others. The grains that constituted the negative latent image are not restored to light-sensitivity, but they do become chemically like unexposed grains in that they will not be affected by the developer; will not be reduced to silver to form the dense parts of a negative; and will be dissolved out in the fixing solution, thus leaving relatively thin areas that constitute the higher-light parts of a direct positive picture of the object.

(E) In connection with the above, it may be noted that most theories of the formation of the latent image postulate the presence of a "bromide acceptor," which prevents the re-combination of the silver and bromine and consequent regression of the latent image. In our direct positive emulsions, the presence of adjacent excess halogen (and hydrogen if acid is used) may be viewed as having the effect of overloading or reducing the capacity of the acceptor so that regression of the latest negative image, that is, so-called "reversal" is directly brought about by action of the light, if the exposure is sufficiently great.

(F) Whether or not our views as to the mechanism of the reversal are correct and complete, it seems abundantly clear, from our work, that the conditions necessary for producing our "reversing" emulsions, run parallel with the conditions necessary to produce strong adsorption of halogen by the sensitive silver halide grain.

(G) The presence of the hydrogen or equivalent ions, aids the adsorption of bromide or equivalent halogen by the silver halide grain, and it is possible that this is the only reason why the presence of acid is so desirable at the time the halide grains are being formed, or reformed, but the fact that the attack of the halogens on colloidal silver is more energetic in the presence of acid, and that we have so far been unable to detect an electric charge on the grains of our direct positive emulsions, leads us to believe that hydrogen, as well as halogen, is adsorbed by the grain and takes an active part in the destruction of the latent negative image during the reversal exposure.

(H) We have used the terms "hydrogen ions" and "halogen ions," because it appears more probable, on general theoretrical grounds, that these elements are present in the ionized form; but we use these terms as the basis for our practical working hypotheses and not as essentials of our invention, for the very good reason that we have no direct proof, and it is unnecessary to be sure whether or not the "hydrogen," "halogen," "bromine," etc., which we use are present in the charged state.

Further examples of direct-positive producing emulsions embodying our invention are as follows:

FORMULA V

Solution A:
    Ammonium chloride __________ gms __ 10.4
    Water _____________________ ml __ 492
    Normal hydrochloric acid ______ ml __ 65
    Gelatin ____________________ gms __ 80
    Temperature _________________ °C __ 64

Solution B:
    Silver nitrate _______________ gms __ 20
    Water _____________________ ml __ 40
    Temperature _________________ °C __ 25

Add Solution B to A in 10 minutes.
Digest 1½ hours at 63° C.
Chill and store in refrigerator over-night (storage temperature of about 15° C. is suitable).
Shred and wash, five baths, five minutes each.
Digest 2 hours at 46° C.
Coat.
pH during first digestion 3.6.
Halide concentration before precipitation .47 molar.
After precipitation .25.
These figures include chlorine derived from the acid.
Halide concentration after washing .11 molar.

The emulsion produced from this formula as above described has substantially the characteristics of that produced from Formula I.

FORMULA VI

Solution #1:
    Potassium chloride __________ gms __ 39.2
    Water _____________________ ml __ 450
    Potassium bromide __________ gms __ 13.1
    Normal hydrochloric acid ______ ml __ 87.5
    Gelatin ____________________ gms __ 100
    Temperature _________________ °C __ 75

Solution #2:
    Silver nitrate _______________ gms __ 75
    Water _____________________ ml __ 75
    Temperature _________________ °C __ 75

Add Solution #2 to Solution #1 in three minutes.
First digestion, 5 hours, 75° C.
Centrifuge sufficiently to produce a clear supernatant solution, and then pour off the liquid and pick up the remaining material in:

Water _________________________ ml __ 687
Potassium chloride _______________ gms __ 1.5
Gelatin ________________________ gms __ 54

Digest 4 hours at 46° C.

pH during first digestion _________________ 2.8
Halide concentration before precipitation
                                    molar __ 1.34
After precipitation __________________________ .48
pH during second digestion _________________ 5.5
Halide concentration during second digestion ____________________________ .034

This emulsion has a reversal speed approximately four times that of the chloride emulsion of Formula I or Formula V, while retaining a high contrast (gamma equalling about 5). As a result it is particularly advantageous for the contact printing of letters or other documents.

The above-specified emulsion may be termed a 25% bromo-chloride, since the bromide is present in an amount sufficient to combine with about 25% of the silver nitrate.

Alternatively, the above formula may be picked up after centrifuging in the following, for use on tracing cloth for reproducing of plans, etc.

| | | |
|---|---|---|
| Water | ml | 300 |
| Potassium chloride | gms | .75 |
| Gelatin | gms | 10 |

Formula VII

Solution #1:

| | | |
|---|---|---|
| Potassium chloride | gms | 24.4 |
| Water | ml | 474 |
| Potassium bromide | gms | 36.8 |
| Normal hydrochloric acid | ml | 71 |
| Gelatin | gms | 75 |
| Temperature | °C | 75 |

Solution #2:

| | | |
|---|---|---|
| Silver nitrate | gms | 75 |
| Water | ml | 75 |
| Temperature | °C | 75 |

Add Solution #2 to Solution #1 in 3½ minutes. First digestion five hours, 75° C.
Then add—

Solution #3:

| | | |
|---|---|---|
| Water | ml | 336 |
| Gelatin | gm | 62.5 |
| Normal sulfuric acid | ml | 23 |

Chill and store in refrigerator over-night. Shred and wash, six baths, five minutes each. Digest four hours, 46° C.

| | |
|---|---|
| pH during first digestion | 2.8 |
| Halide concentration before precipitation molar | 1.34 |
| After precipitation do | .48 |
| pH during second digestion | 3.8 |
| Halide concentration during second digestion molar | .13 |

This emulsion (a 70% bromo-chloride) is suitable for pictorial copying. It has a speed about three times that of the emulsion of Formula VI and a gamma value of about 1.

Formula VIII

Solution #1:

| | | |
|---|---|---|
| Ammonium bromide | gms | 30 |
| Water | ml | 260 |
| Potassium iodide | gms | .16 |
| Gelatin | gms | 3.3 |
| Normal hydrochloric acid | ml | 5 |
| Ethyl alcohol | ml | 5 |
| Temperature | °C | 95 |

Solution #2:

| | | |
|---|---|---|
| Silver nitrate | gms | 15 |
| Water | ml | 67 |
| Temperature | °C | 95 |

Add Solution #2 to Solution #1 in five minutes.
Digest 10 minutes at 95° C.
Centrifuge to produce a clear supernatant liquid and pick up the solid material in—

Solution #3:

| | | |
|---|---|---|
| Ammonium bromide | gms | .13 |
| Water | ml | 220 |
| Gelatin | gms | 40 |
| Normal hydrochloric acid | ml | 22 |
| Potassium sulfocyanate | gms | .32 |
| Thiosinamine | gms | .16 |

Digest 6 hours at 46° C.

| | |
|---|---|
| pH during first digestion | 1.7 |
| Halide concentration before precipitation molar | 1.2 |
| Halide concentration after precipitation molar | .9 |
| pH during second digestion | 4.4 |
| Halide concentration during second digestion molar | .09 |

The speed of this emulsion is approximately that of Formula III, and its gamma value is about 1.4.

The centrifuging hereinbefore referred to may be carried out in any suitable apparatus of well-known type. For example, the emulsions of Formulae Nos. VI and VIII, supra, were centrifuged in a bottle-type centrifuge, in which the bottles were arranged on a radius of about six inches. The machine was given a speed of about 2000 R. P. M. In the case of Formula VI the centrifuging was conducted for about ten minutes. Emulsions similar to Formula VIII usually require about three to five minutes.

The soluble halide in the gelatin in which the centrifuged material is picked up is provided for the purpose of insuring the retention of the reversing properties conferred by precipitation and first digestion by preventing undue stripping of adsorbed halide from the silver halide grains during second digestion.

Halide need not be added to the pick-up gelatin referred to in connection with washed emulsions hereinbefore described since the washing is sufficiently curtailed to avoid removal of halide to such an extent as to result in undue stripping of adsorbed halide from the grains during second digestion.

The foregoing facts, hypotheses, and illustrative formulae have enabled us, and will enable others to better understand permissible variations in composition and manufacture of direct positive emulsions embodying our invention.

pH and concentration of halide during grain formation

The concentration of soluble halide in the solution before precipitation, after precipitation and during first digestion, and the pH of the solution throughout these stages of manufacture may be considered together in view of their interrelationship as hereinafter more particularly noted.

The precipitation and first digestion are very similar processes. In precipitation the grains grow by the accumulation of the silver added to the solution. During first digestion at least some of the grains grow and it is likely that all of them undergo some solution and reprecipitation of silver halide on their surface, so that physically the two processes are very similar.

Thus we may achieve substantially the same results by a larger concentration of halide in the beginning of the precipitation, as by prolonged digestion with a considerably smaller concentration of halide, and by employing an acidity of about pH 2.5 to 4 we may reduce the halide concentration materially and still obtain satisfactory results.

While good results may be obtained by adding the acid and halide excess after precipitation and before first digestion, the best results are achieved when said acid and excess are present during precipitation, because that is the time when conditions are most favorable for adsorption. If the acid and excess halide are not added until after washing or centrifuging they will produce substantially no beneficial effect so far as reversal properties of the emulsion are concerned.

The effect of the variables is also modified by the halide used; thus pure chloride emulsions can be successfully made by different formulae than pure bromide emulsions. The effect of the mixture of the two and of the percentage of iodide in bromide emulsions will further modify the situation.

Despite the close association between the variables, however, certain basic values emerge from our data.

In the case of pure chloride reversing emulsions (such as our Formulae I and V), we have found it important that the pH of the emulsion in the grain forming stage be below the iso-electric point of the gelatin, i. e., below 4.7. The same has been found to be true of emulsions containing both chloride and bromide salts where the amount of bromide does not exceed about ten molecular percent. At pH values below 4.7 we have made pure chloride emulsions having a molar concentration of chlorine of .5 at the start of precipitation and of .27 at the end. These molar concentrations include the chlorine present in the hydrochloric acid used to lower the pH, which in the aforesaid emulsion was approximately 2.7. Our experience indicates that for a pure chloride emulsion to be effective for improving the density ratio so that a density ratio of at least 4 can be attained, a molar concentration of chlorine of at least .2 is required after precipitation and during first digestion.

As the percentage of bromide increases in the emulsion, the pH becomes less important and it is possible to make an emulsion at pH values as high as 7. However, even with increased percentages of bromide, a low pH, though not necessary, is found to result in improved density ratios.

The use of acid has a further desirable effect in that it permits the use of higher concentrations of halide during precipitation and first digestion without causing coagulation of the precipitated grains. The reason for this is not understood, but the effect is substantial and permits a much wider choice of concentration.

The concentration of soluble halide in the solution before precipitation may vary considerably. Our data indicates an optimum value range of from about .7 to about 1.8 moles per liter of halide concentration before precipitation. At a concentration of about 2 moles per liter coagulation is frequently encountered. The data above referred to was derived from emulsions which were given first digestion. From our experience, we prefer that the concentration of bromine at the start of precipitation be greater than 1 molar in a bromide emulsion.

With further reference to halide concentration during first digestion, we have found it desirable that in the case of emulsions containing over fifteen molecular percent of bromide, the halide concentration should be in excess of .3 molar in order for the digestion to be effective in favorably modifying the density ratio.

The effect of increasing halide concentration during first digestion is to increase the density ratio. The upper limit of the concentration will in any case be determined by the point at which the grains coagulate. Coagulation is a readily recognizable phenomenon. While affected by the halide concentration, it may be noted further that coagulation is also modified by the gelatin concentration, the greater the concentration of gelatin the less the tendency of the silver halide grains to coagulate.

As an example of the effect of pH value and gelatin concentration on coagulation, we have found that at pH values above the iso-electric point (4.7) of gelatin, coagulation will take place during first digestion with a halide concentration of .3 molar or above and with a gelatin concentration of 16 percent, whereas, under the same conditions, with a pH of 3.2 the concentration may be carried to .6 molar without serious coagulation.

Coagulation also depends upon solution of the grain and involves a time element. For instance, in bromo-iodide emulsions, precipitated and digested at a rather high temperature (95° C.), the first digestion being only ten to twelve minutes, coagulation will not take place during first digestion even at halide concentration of one molar and above.

We may further point out that the silver halides are partially soluble in solutions of soluble halides and that the concentration of soluble halide should be high enough for the silver halide to be definitely soluble therein (as determined by a definite change in size or shape of the grain as digestion proceeds) for first digestion to be effective for improving the density ratio.

In general, the silver chlorides should be precipitated and digested at a low pH (below the iso-electric point of the gelatin) but the concentration of halide may be lower than in bromide emulsions and the concentration of gelatin may be high. The pure bromides and bromo-iodides containing a very small percentage of iodide (½ molecular per cent or less) may be successfully made at a high pH but require a somewhat higher concentration of soluble halide.

The presence of a larger percentage of iodide (one molecular per cent or above) causes an increasing loss of silver efficiency. The latter may be defined as the ratio of the maximum developable density to the silver coated per unit area of the coated surface (in terms of grams of silver per square meter) or, in other words, as the percentage of the total number of grains per unit area which will develop out under the standard conditions of development after exposure of the coated emulsion to that point on the sensitometric curve which corresponds to the maximum density. The loss in silver efficiency due to increase in percentage of iodide may be partly offset by lowering the halide concentration, but the effect becomes so powerful at 5 molecular percent of iodide that it is found practically impossible to make a satisfactory reversing emulsion.

*Concentration of gelatin during grain formation*

The gelatin concentration is susceptible to wide variation. In general, increasing the gelatin concentration progressively lowers the ratio of maximum to minimum density. However, the gelatin concentration should not be lowered to such extent as to diminish unduly silver efficiency and contrast. We have found that chloride and bromo-chloride emulsions have better all around characteristics when a relatively high gelatin concentration (such as about 15% to 18%) is employed, whereas in bromide and bromo-iodide emulsions the gelatin concentration may be as low as 1½% or 2%. Indeed, for bromide and bromo-iodide emulsions it is found distinctly desirable for optimum reversing properties to utilize low concentrations of gelatin during precipitation and first digestion; and the evidence indicates that the gelatin concentration may be advantageously cut down to the point where it just suspends the precipitating silver bromide. This accords with the fact that gelatin is preferentially adsorbed to the silver bromide and tends to inhibit the above mentioned adsorption of other ions, such as bromine, and hydrogen. In fact, sufficiently cutting down gelatin and increasing bromine or soluble bromide, makes it possible to dispense with hydrogen or equivalent ions, as will be explained later.

*Time and temperature of first digestion*

An important effect of first digestion in the production of our emulsions is to lower the minimum density on the reversal side of the sensitometric curve and thereby to improve substantially the density ratio. First digestion should therefore be carried out for a time sufficient to obtain the desired lowering of minimum reversal density. The period of first digestion may vary as will be evident from the descriptions of the specific emulsion formulae hereinbefore set forth. It may, indeed, be observed further that slow precipitation may be substituted in whole or in part for first digestion. The slow precipitation permits time for the adsorption of halide in the crevices and irregularities in the grain as it is being enlarged in size by the further addition of silver. Excessive first digestion raises negative fog and diminishes positive contrast.

The temperature during precipitation and first digestion is variable through a wide range as indicated by the foregoing examples of our emulsions. Prolonged digestion at low temperature has substantially the same effect as shorter digestion at higher temperature.

*Character of the metal of the soluble halide salt*

We have found that ammonium, potassium, and lithium are equally suitable as the cation or metal of the soluble halide salt. They are preferable to sodium, since the latter gives a higher minimum reversal density.

Nickel, zinc, or strontium may also be utilized, as the metal of the soluble halide salt, at least in amounts up to about 25 molecular percent. Copper may also be employed.

*Character of the acid or equivalent substance*

The hydrogen ion is the effective constituent of the acid used and the character of the anion has small effect. We have successfully used hydrochloric, hydrobromic, nitric, sulphuric, phosphoric, and citric acids. Acetic acid was not satisfactory because with the large amounts required to obtain the desired low pH, it decomposed the gelatin.

The different acids modify somewhat the shape of the photographic curve and to some extent the speed of the emulsion. In the case of bromide emulsions, for instance, comparing hydrobromic acid with hydrochloric, the former will produce an emulsion about one and one half times faster, but with a lower contrast and slightly lower minimum reversal density. As noted hereinbefore (as exemplified by formula IV), positive ions other than hydrogen may be used, though we have not found any as effective or convenient as hydrogen.

It will, of course, be apparent from what has been noted hereinbefore that if the acid contains halide ions that are relied upon to increase the halide concentration to a desired value, a change to sulphuric or other acid not containing halide should be compensated by increasing correspondingly the amount of soluble halide salt.

With further reference to electro-positive ions other than hydrogen, for promoting the adsorption of halides to effect reversal, we find that such ions should preferably be close to hydrogen in the electro-motive force series. The strongly positive alkali metals such as potassium and sodium are not desirable for this purpose, whereas nickel and silver are suitable. Furthermore, the metal or electro-positive ion, must be chemically "compatible" with the solutions used in precipitation or first digestion. Lead and mercury, for example, produce insoluble halide salts and would be thrown out of solution. In addition, the metal must not be photographically "antagonistic." The use of iron, for instance, is not indicated because of its deleterious effect on the normal characteristics of an emulsion.

The valence is not important, as is evident from the fact that the nickel in the salt used in Formula IV was bivalent, whereas hydrogen and silver are monovalent. However, it will be apparent that a metal should not be used the valence of which might produce an oxidizing reaction, since this would diminish the normal photographic sensitivity.

*Concentration of silver nitrate and time and manner of its introduction*

The prime effect of the concentration of silver nitrate is to change the ratio of halide concentration before precipitation to the halide concentration after precipitation. Hence the most important effect of this factor has already been discussed.

Variations in the time and manner of introduction of the silver nitrate, appear, as in negative emulsions, to vary the emulsion speed and contrast. We have found, for example, that high contrast positive emulsions are normally produced by rapid introduction of concentrated silver nitrate solution as is the case in high contrast negative emulsions.

*Stirring*

The effect of rapid and effective stirring which is preferred, is to produce a more uniform emulsion, and, in general, emulsions of higher contrast. We have found that effective stirring during precipitation produces a more uniform grain size, a higher contrast, and a better ratio of maximum to minimum density in the finished emulsion. The improvement in density ratio due to stirring may be explained on the basis that thorough stirring brings the silver halide grains more effectively into intimate contact with the excess halide of the solution.

*Removal of soluble salt*

Washing or centrifuging should accord with our theory that the silver halide grains should not be to much stripped of their associated reversing material. We have found that if the soluble halide concentration is reduced below .01 molar the reversal characteristics become very poor and at .005 molar they are practically destroyed. In other words, it is our experience that if the soluble halide concentration is reduced by removal of soluble salts to a value lying somewhere between .005 and .01 molar, a practical reversing emulsion will no longer result. For pure chloride emulsions, or bromo-chloride emulsions containing large percentages of chloride, it is preferable that the soluble halide concentration should not be reduced below .02 molar. With emulsions containing a substantial amount of bromide (as for example a pure bromide emulsion or a bromo-chloride emulsion of about 70 molecular percent bromide) the soluble salt reduction should preferably not be carried below a point around .01 molar as indicated above.

Our usual practice is to shred the emulsion into "noodles" approximately ¼ inch square and wash with distilled water, five baths of five minutes each. The "noodles" are not stirred while the water lies on them but are shaken up when the water is poured off at the end of each bath.

Our practice in centrifuging is to centrifuge only once. That is, the grains are thrown down, the solution used in first digestion poured off, and the grains are picked up in a fresh gelatin solution containing some soluble halide.

The washing procedure outlined above leaves a halide concentration of approximately .13 molar in the emulsion.

In the centrifuged emulsion the halide concentration may be brought up to approximately this same value by adding halide to the gelatin pick-up solution. Experience has shown that this concentration is approximately the best, although it may vary through wide limits either way.

Washing between five and ten successive baths has been found satisfactory, but washing much more than this reduces obtainable reversal speed and raises minimum density. Washing to the extent commonly used for negative emulsions has resulted in emulsions that were badly fogged and which showed no reversal, even after prolonged exposure.

Second digestion

The effect of second digestion is most clearly marked in our pure bromide and bromo-iodide emulsions. These emulsions, after washing or centrifuging, almost invariably show a very flat curve with negligible maximum density. Second digestion causes a marked increase in density ratio by raising the maximum developable density, which increase is effected without any large increase in mininmum density. Excessive second digestion finally raises the minimum density and causes a substantial loss in speed.

Second digestion does not cause a reduction of minimum obtainable reversal density. Consequently, the potentialities of the emulsion may be determined, after removal of soluble salts and before second digestion, upon the basis of what may be termed "silver ratio," defined as follows:

Silver ratio=the ratio of grams of silver coated per square meter to minimum reversal density If precipitation, first digestion, and reduction of amount of soluble salts have been properly performed, the silver ratio at this point will be at least 4 to 1; and if said ratio is less than this value, second digestion will not produce a practical reversing or positive emulsion.

We have not found that the gelatin concentration in second digestion has any effect on the photographic characteristics other than those which could be accounted for by differences in the rate of development due to thicker or thinner gelatin film in the coated product.

The lower limit of soluble halide during second digestion is the same as that given above under "Removal of soluble salts." The upper limit is the concentration at which the silver halide grains become appreciably soluble. At this upper limit the effect becomes the same as additional first digestion. The rapidity with which the emulsion digests to the optimum point varies with the halide concentration, being more rapid, the lower the concentration.

The time and temperature of second digestion are not critical. In pure chloride emulsions it is frequently unnecessary to employ second digestion at all, the density ratio and contrast being sufficiently high after reduction of the amount of soluble salts. Our usual practice in bromochlorides containing from 25% to 70% (molecular) of bromide is to digest for two to four hours at 46° C. Pure bromide and bromo-iodide emulsions usually require somewhat longer digestion to develop the desired density ratio at the above noted temperature.

As previously indicated, in connection with Formula III, the inclusion of thiosinamine in second digestion is not effective for increasing the sensitivity of our positive or reversing bromide emulsions, unless the thiosinamine is added in quantities much greater than in negative emulsions. It is believed that thiosinamine reacts with silver bromide in a complex manner to form silver sulfide as an end product of reaction, together with hydrogen ions and bromine ions. As a result, the presence of high concentrations of bromine ions, such as are present in our bromide and bromo-iodide emulsions, and the relatively high concentration of hydrogen ions which we frequently employ, deters the reaction between the thiosinamine and silver halide. In our bromide and bromo-iodide emulsions we prefer to employ as much as 1 part of thiosinamine to 1500 parts of gelatin.

With respect to pH values during second digestion, the pH should not be above 4.7 for pure chloride emulsions. Using only a very small percentage of bromide, however, makes it possible to raise the pH to 7 or above during second digestion.

The desirable value of pH during second digestion is determined by several factors. The addition of acid lowers the viscosity of the emulsion and this should be taken into account in adjusting the coating conditions. In practice, in second digestion of our high contrast bromochloride emulsions, exemplified by Formula VI, the pH is usually around 5.5, though this is not critical. In pure bromide emulsions the pH will depend upon the type of sensitizer used. When thiosinamine is employed as a sensitizer, best results are obtained at pH values above 6. However, the inclusion of ammonium or potassium sulfocyanate with thiosinamine (as in Formula VIII, Solution #3) enables excellent sensitizing results to be attained at lower pH values than are possible when thiosinamine alone is used.

Other sensitizers, less affected by hydrogen and bromine ions than is thiosinamine, may also be useful. Some known sensitizers, such as thiourea, have a tendency to produce fog, but this is not necessarily a prohibitive disadvantage in direct positive emulsions.

Further characteristics of our emulsions

Our emulsions have the following additional characteristics whereby we believe them to be uniquely identified.

1. When our emulsions are washed in pure water for a few minutes before exposure, and then dried, exposed and processed, it will be found that their reversing properties are practically destroyed.

2. Washing after exposure and before processing has no effect on the photographic characteristics.

3. When our emulsions are moistened with water and exposed in the moist state the reversing properties are substantially destroyed.

4. If the emulsions are washed before exposure in a solution of the appropriate soluble halide, the concentration of the solution being such that the concentration of halide in the emulsion would not substantially be changed by the washing, and then dried, exposed and processed, it will be found that the reversing properties have not been substantially modified.

Coating

Coating of our emulsions may be conveniently carried out with conventional coating machines. The customary coating agents may be employed, such as formaldehyde and chrome alum for hardening the gelatin and rendering it insoluble; soap bark or saponin to cause an even spreading and wetting on the support by the emulsion and alcohol to inhibit frothing.

Coating on glass, Celluloid or other supports impervious to water presents no problem not met with in negative emulsions. However, when our emulsions are coated on paper a new problem arose in that the density ratio was lowered due to a marked rise in the minimum obtainable density. This was found to have resulted from the absorption by the paper of halide ions from the emulsion and may be remedied by passing the paper to be coated through a strong solution of soluble halide, and thereafter coating with the emulsion. Before coating the paper may be dried or it may be coated while still wet.

Alternatively, the amount of halide which the paper will absorb may be determined and the calculated quantity of halide added to the emulsion shortly before coating. We do not claim the aforesaid improvements in coating on paper or other moisture-pervious support as our joint invention, since said improvements are the sole invention of George B. Crouse.

Tests for determining potential reversing properties

It has not been found feasible to compensate, after removal of soluble salt, for any errors in formula or procedure occurring in prior operations, in the preparation of our emulsions, and it is therefore highly desirable to have a means of testing the potentiality of the emulsion during early stages of manufacture. The simple procedure outlined below furnishes the means of accomplishing this object.

The test may be applied at any time after precipitation and before washing or centrifuging to determine whether the formula and manipulation are correct up to that point. The test is based on the fact that a formula capable of making a practical emulsion embodying our invention, will, before the soluble salts are removed, show distinct solarization when exposed in the wet state. The test is performed as follows:

Approximately .5 ml. of emulsion is withdrawn from the kettle and coated on a 1" by 3" microscope slide, or equivalent area. The slide is chilled and immersed in pure cold water for 5 to 10 minutes (5 minutes for a chloride emulsion and 10 minutes for a bromide emulsion). It is then immediately exposed in the wet state either through a step wedge or by means of exposures varied in time. The exposures are carried to sufficiently large values to determine whether or not the emulsion definitely shows solarization when developed under convenient standard conditions.

If the emulsion cannot be made to show definite solarization at any exposure, the formula and manipulation are incorrect. If definite solarization is visible, proper after treatment will result in a practical reversing or positive emulsion.

To give an illustration of the manner in which this test may be utilized, the following may be noted:

Suppose that it is desired to produce a reversing emulsion of a given type, and that we start with a conventional negative formula. The test may be applied to the emulsion after precipitation and again after a reasonable amount of first digestion. The test will, of course, show negative results, that is, no solarization will be visible.

One of the conditions for producing a reversing emulsion embodying our invention is to provide sufficient halide concentration during precipitation and/or first digestion. Successive trials may be made, increasing the halide concentration and applying the test each time until the test shows a positive result, which will fix, for a particular formula, the minimum necessary halide concentration.

Then, after first digestion and removal of soluble salts, we can apply a second test to determine whether the minimum limit for the removal of soluble salt has been overstepped or not. For this purpose, a plate or microscope slide is coated with a quantity of said emulsion (following removal of soluble salts) to provide a known amount of silver per unit area, chilled, and dried in the usual way.

Sufficient exposure is then given to the plate to produce upon development the minimum obtainable reversal density. This plate, when developed under standard conditions, as stated below, or equivalent, should show a ratio of grams of silver per square meter to minimum obtainable density of 4 or more. If it does so the emulsion may then be given second digestion to produce the best density ratio. If the ratio is less than 4 no subsequent treatment will produce a practical emulsion.

In connection with the above two tests the development procedure is as follows:

| | |
|---|---|
| Water (about 125° F.) cc | 500 |
| Elon gm | 1 |
| Sodium sulphite gm | 75 |
| Hydroquinone gm | 9 |
| Sodium carbonate gm | 25 |
| Potassium bromide gm | 5 |
| Water to make liter | 1 |

The above solution is diluted with water, 1:1.

Plates are developed at 65° F. for 3 minutes, the tray being rocked by hand.

Theory

As previously noted, our theory as to the reasons why reversal is accomplished in our emulsions is that halide ions become intimately associated with or adsorbed to the silver halide grain, and that when light of sufficient intensity acts upon such a grain the halide is liberated in greater proportion than metallic silver. The concentration of halide ions around the latent image thus builds up to the point where it is sufficient to combine with the liberated silver and thus destroy the latent image. We will not here repeat the evidence, hereinbefore referred to, which appears to support our theory, but we will note briefly certain further considerations which lend it further weight. Of course, whether or not our views are correct as to the manner in which the latent image is destroyed is not material, but an explanation of the possible production of the reversal effect in our novel emulsions on the basis of the evidence at hand may be helpful in an appreciation of certain aspects of our invention.

Obviously in those of our emulsions which are made at relatively high pH values (above the isoelectric point) no new material is added to cause reversal, and all of the evidence indicates that it is the excess halide which brings about the reversal characteristics.

Further, it is not the mere presence of the excess halide in the emulsion which is effective since the addition of halide to a non-reversing emulsion will not cause it to reverse unless the grains are actually digested in such high halide concentration.

The matter may be viewed from the concept of a force or potential existing between the silver halide grain and the associated halide ions or halide containing molecules. To make this clearer, consider the behavior of a bromide emulsion throughout its manufacture.

With a properly balanced formula, and given the correct amount of first digestion, a test plate made and tested as directed under "Tests for determining potential reversing properties," above, will show pronounced solarization in the wet state. When this emulsion is washed or centrifuged and coated, it will be found that it will produce only a very low ratio of maximum to minimum density, and prolonged digestion in a solution less rich in halide than that used during first digestion is necessary in order to produce a satisfactory density ratio through the increase in the maximum developable density.

On the other hand, if instead of the usual washing procedure, prolonged washing is employed, it will be found that the emulsion, before second digestion, has substantially the same characteristics as before. However, very short second digestion is sufficient to separate the adsorbed halide from the grains and it is practically impossible to produce a satisfactory emulsion because the second digestion time becomes extremely critical.

Referring again to this same test, our finished emulsions will stand very little washing before exposure, and also will show substantially no reversal when exposed wet, whereas, at any point before the removal of soluble salts, the test previously outlined herein will show solarization. This may be accounted for on the basis that an emulsion in which the adsorption of reversing agent after precipitation or first digestion is sufficiently great to reverse in the wet state, will retain the adsorbed material on its silver halide grains with sufficient tenacity so that reversing properties will not be lost when the concentration of soluble halide or other reversing agent in the solution surrounding the grains is reduced by washing or centrifuging or when the amount of adsorbed material on the grains is reduced by second digestion. It appears that as long as the concentration of soluble halide surrounding the grain is high, the bond between the adsorbed halide and the silver grain is strong, whereas reducing the concentration of halide in the environment weakens the bond which is still further weakened by digestion or heat treatment.

There is thus a best value of the strength of this bond; if the bond is too strong some of the grains reverse too quickly before others have had a chance to build up density and the result is a low overall density. If the bond is too weak, the emulsion becomes unsatisfactory because a large percentage of the grains then fail to reverse at all, producing a high minimum obtainable density.

It is probably theoretically possible to so adjust conditions in precipitation and first digestion that this bond would have the correct value to produce a practical emulsion without second digestion, and, as a matter of fact, we have accomplished this in pure chloride emulsions and in emulsions containing small percentages of bromide. In the pure bromide emulsions we have not been able to do this, and second digestion is required to adjust the factor to a value which produces a practical finished product.

Further strength is given the theory by the difference in behavior between chloride and bromide emulsions. It is well known that the strength of adsorption between silver chloride and the chloride ion is inherently weaker than between silver bromide and the bromide ion. Thus the mere removal of the bulk of soluble halide from the chloride emulsion is generally enough to weaken the bond so that a satisfactory silver efficiency is obtained. In bromide emulsions where the bond is strong it is generally advisable to employ relatively long second digestion.

We may also point out that in line with the idea just set forth, the reversing properties of chloride emulsions are more easily destroyed than those of bromide emulsions. Thus, as we have previously indicated, the halide ion concentration should not be allowed to reach as low a value after removing the soluble salt and during second digestion, in a chloride emulsion, as is permissible in an emulsion containing a considerable quantity of bromide.

Summing up conditions favorable to good reversal qualities, it appears: First, precipitation and first digestion must be under such conditions that in addition to the amount of halide necessary to combine in molecular proportions with the silver, there will be other halogen intimately associated with or adsorbed on the grain. Second, most of the halide, but not all of it, will be removed from the emulsion by the washing that removes the soluble-salt products of precipitation. Third, the part of the halogen in the gelatin which remains in the immediate neighborhood of the grains, must be diffused through the bulk of the gelatin during second digestion, without stripping the grain itself of halogen. Fourth, in the case of the bromide and bromo-iodide emulsions, sufficient sensitizer and second digestion must be given to satisfactorily increase the density ratio and also normal speed of the emulsion so that on each exposed grain the latent image nucleus will be built up to the point of reversal at high speed. Still more generally stated, we must (a) adsorb halogen on the silver halide grain, (b) get rid of the excess soluble halide in the bulk of the gelatin without losing the adsorbed halogen from the grain, and (c) in the case of bromide and bromo-iodide emulsions, we must use sensitizers in unusual amounts to obtain high speed.

FORMULA IX

As further illustrative of variations in formulae we may note the following, in which conditions favorable to the adsorption of halide are preserved and good results are attained, without the aid of positive ions (such as hydrogen of the acid in Formula III or nickel of the nickel chloride in Formula IV):

Solution A:
- Gelatin _______________________ gms__ 2
- Ammonium bromide ____________ gms__ 12.48
- Potassium iodide ______________ gm__ .08
- Water to make _________________ ml__ 145

Solution B:
- Silver nitrate _________________ gms__ 10
- Water to make _________________ ml__ 110

Solution C:
- Ammonium bromide ____________ gms__ 5.76
- Water to make _________________ ml__ 110

Solution D:
- Bromine _______________________ gm__ .005
- Water to make _________________ ml__ 5

Solution E:
- Thiosinamine __________________ gm__ .017
- Water to make (about) _________ ml__ 2

For purposes of illustration and comparison, the above formula is the same and the manufacture is the same as for Formula III, except that the hydrobromic acid was omitted from Solution A, and no acid was present during precipitation. It is also the same as Formula IV except there was no nickel chloride in Solution A, so no positive ionic nickel was present during precipitation or first digestion. There was of course no acid to neutralize, but we preferred to add a small quantity of potassium hydroxide before adding the thiosinamine, the idea being that by thus slightly raising pH during the prolonged second digestion the action of the thiosinamine would be aided.

As expected, the emulsion resulting from Formula V is substantially the same in photographic characteristics as that produced by Formula III, except that reversal speed is somewhat slower, and minimum density somewhat higher.

In the Formula IX emulsion the pH was 6.1. The halide concentration before precipitation was .88 molar and during first digestion was .35 molar.

*Substances other than halides*

It will be apparent that substances other than halides may act in like manner if suitably associated with, or adsorbed to, the silver halide grain, and, as a matter of fact, we have found that the sulfocyanate ion may be used in this manner. The sulphocyanate ion is capable of combining with silver to effect reversal as illustrated by way of example in the following formula, wherein potassium sulfocyanate is substituted in part for the excess halide in the solution during precipitation and first digestion:

FORMULA X

Solution #1:
- Gelatin _______________________ gms__ 100
- Normal hydrochloric acid ______ ml__ 87.5
- Potassium chloride ____________ gms__ 27.7
- Potassium bromide ____________ gms__ 31.6
- Potassium sulfocyanate (solution—32 mg. per ml.) _____________ ml__ 30
- Water _________________________ ml__ 420

Solution #2:
- Silver nitrate _________________ gms__ 75
- Water _________________________ ml__ 75

Heat Solution #1 to 75° C. and add Solution #2 in three and three-quarters minutes.
First digestion, 5 hours, 75° C.
Centrifuge and pick-up in:

- Water _________________________ ml__ 676
- Potassium chloride (10% solution) __ml__ 15
- Gelatin _______________________ gms__ 54

Store overnight, conveniently in a refrigerator at about 40° F.
Digest 3½ hours at 46° C.
- pH during first digestion _______ about__ 2.8
- Halide concentration before precipitation
  molar__ 1.34
- After precipitation ______________ do____ .46
- pH during second digestion ______________ 6
- Halide concentration during second digestion ____________________ molar__ .034
- CNS concentration before precipitation
  molar__ .018

The reversal speed of this emulsion is approximately that of emulsion VII, hereinbefore referred to and its contrast is intermediate that of emulsions VII and VI.

We have found that potassium sulfocyanate, when used during first digestion for bromo-chloride emulsions (of the order of about 50 molecular percent bromide or over) raises contrast and maximum density. However it has not been found suitable for use during first digestion in the case of bromo-chlorides of substantially lower bromide content (25 molecular per cent bromide, for example).

Among the many advantages of our new direct positive emulsions is that they may be exposed and processed with the same ease and simplicity as an ordinary negative emulsion.

(1) Exposure may be carried out in a camera, projection printer or by contact with a transparency. Positive copies may be made directly from positive originals.

(2) The exposure is adjusted to fall within the range of the material as in ordinary emulsions. The effect of an error in exposure is different with the direct positive material, however, than with negative materials. In the case of the latter, over-exposure will produce an image which is too dark all over. In the case of the direct positive emulsion, over-exposure will produce an image which is too light, while under-exposure will produce an image too dark, which may, for gross under-exposure, be a negative.

(3) The direct positive emulsion may be developed in any of the standard developing solutions, using standard technique. Variations in the composition of the developing solution will have much the same effect as with negative emulsions.

*All-over exposure.*—Uniform all-over exposure merely adds a definite uniform amount of light to all the different amounts of light received from different parts of the object during image exposure; and the effect is the same whether the uniform light is added before, during or after image exposure. Consequently, the amount of light contributed by the additional uniform exposure, must be regulated with respect to the light contributed by the image exposure, so that the sum total will have the proper value with respect to the reversal curve between maximum density point 2 and minimum density point 3, Fig. 3.

Figure 1:
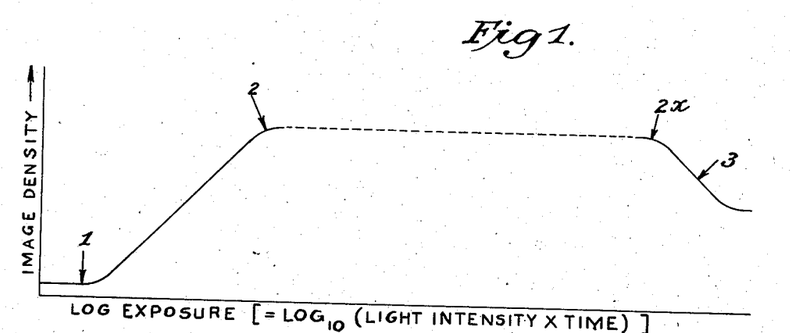

In the case of emulsions in which reversal takes place only after a long maximum density range, as indicated by the line between 2 and 2x, Fig. 1, it has been proposed to give the emulsion a preliminary all-over darkening to the point 2x, either by all-over exposure or by chemical fogging, in order to reduce the time required for the image exposure. Fig. 2 shows that with our emulsions, reversal begins quickly after the maximum density at 2 is reached. It may be shown that under these circumstances such predarkening is more effective.

Figure 3:
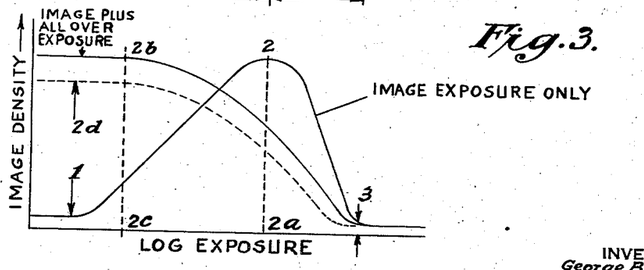

We may use such regulated over-all exposures to produce other effects, as follows:

(1) We may use it to decrease contrast in the developed positive, as is indicated by the flattening of the slope of the "image plus over-all" curve 2b—3, Fig. 3, as compared with the steeper curve 2—3 for "image exposure only."

(2) As shown by the dotted line, 2d—3, Fig. 3, a greater amount of over-all exposure will decrease maximum density, in addition to further decreasing contrast.

(3) The range or latitude of image exposure which can be faithfully reproduced in the developed positive, is increased, as indicated by the shift of the 2—2a line of reversal density for "image exposure only," backward along the "log exposure" line, to line 2b—2c which is maximum density for "image plus over-all."

(4) As a corollary of the foregoing, an image exposure of such latitude as to produce only a partial negative image in the shadows, may be converted to a good positive, by a proper amount of over-all exposure.

The following are examples illustrating practical advantages of our emulsions, for certain special purposes:

(1) In rotogravure printing, the original copy is usually received in the form of photographs, drawings, etc. (a) These are re-photographed to form a negative. (b) A contact print of this negative is made to form a positive transparency. (c) This transparency is then laid down on the sensitized carbon tissue, previously printed through a rotogravure screen. (d) The carbon tissue is exposed through the transparency, then (e) developed in warm water. (f) Through the resist thus formed, the final printing cylinder is etched.

(a) For such purposes, use of our emulsions obviates making a negative, the positive transparency being produced, ready for laying down on the carbon tissue, by photographing it directly from the original picture. This saves labor, degeneration of the image, and time between the receipt of the copy and completing of the cylinder.

(b) In the positive transparency, good and bad originals must be brought to substantially the same degrees of contrast, so the contrast in all of the pictures printed on the same page will be substantially the same; but very little of this can be done by re-etching on the cylinder. With our emulsions such changes may be effected by simply giving different amounts of all-over exposure to different areas of a picture, or to different pictures on the same film.

(2) In talking motion pictures, it is common to print the sound record alongside the pictures on the positive used for projection. In one system the sound variations appear as varying densities in a strip of uniform width, and in another system they appear as varying areas of uniform density; but whichever system is used, many cases will arise in which the density range and contrast required for the picture will be widely different from that required for the sound record. Where the exhibition positive is printed from a negative by ordinary negative-producing methods as at present, the only way in which contrast can be varied is by varying the development, and it will be obvious that where scene and sound on the same film require different contrasts, it is very difficult to give them the required different developments.

With our direct positive emulsions, it is a simple matter to give one of the areas an over-all exposure of the amount required for the desired contrast in that area, without affecting the other area.

(3) The latter method is also very useful in printing still pictures. For instance, in printing by projection, local reduction of density may be secured by the local application of light from a small flash-light. That is, the picture may be more or less locally "re-touched" by use of a tiny flash-light, with or without the aid of masking to localize the effect.

As concerns the meaning of some of the terms used in our claims, it will be recognized that, in producing the latent image the light acts to cause separation between some of the silver and the halogen with which it was combined, and, as concerns the silver, this is a "reducing" action. The effect of the further light, whereby the latent negative is destroyed, is a chemical reaction which is the reverse of the primary reducing action, and so, in the chemical sense, it is properly describable as an "oxidizing" reaction, although it is not produced by oxygen.

For convenience, the word "halogen" as used herein is to be understood as not including fluorine, but only chlorine, bromine and iodine.

The expression "stage of grain formation" in the ensuing claims refers to either precipitation or first digestion, or both.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. The process of producing a direct positive emulsion, comprising precipitating silver halide grains in a solution containing gelatin; including in said solution a soluble halide additional to said silver halide grains and capable, upon sufficient exposure to light, of destroying the developability of said grains; digesting said solution to permit said grains to grow in said solution in the presence of said soluble halide; introducing into said emulsion prior to completion of said digestion sufficient acid to produce a pH lower than 4.7; said soluble halide being present in such concentration during said digestion that upon exposure of the emulsion in a moist state and subsequent development, after said digestion, and prior to reduction of soluble salt concentration, solarization is exhibited; and reducing the soluble salt concentration while maintaining said soluble halide in the emulsion in a concentration of at least .01 normal despite said reduction.

2. The process of producing a direct positive emulsion, comprising precipitating silver halide grains in a solution containing gelatin; including in said solution a soluble halide additional to said silver halide grains and capable, upon sufficient exposure to light, of destroying the developability of said grains; digesting said solution to permit said grains to grow in said solution in the presence of said soluble halide; the pH of said solution being not substantially higher than 7 during said precipitation and digestion; said soluble halide being present during said digestion in a concentration less than sufficient to cause coagulation of said grains but sufficiently high that upon exposure of the emulsion in a moist state and subsequent development, after said digestion, and prior to reduction of soluble salt concentration, solarization is exhibited; and reducing the soluble salt concentration while maintaining said soluble halide in the emulsion in a concentration of at least .01 normal despite said reduction.

3. The process of producing a direct positive emulsion, comprising precipitating silver halide grains in a solution containing gelatin; including in said solution a substance capable, upon sufficient exposure to light, of combining with metallic silver and destroying the developability of said grains; digesting said solution to permit said grains to grow in said solution in the presence of said substance; the pH of said solution being not substantially higher than 7 during said precipitation and digestion; said substance being present during said digestion in a concentration less than sufficient to cause coagulation but sufficiently high that upon exposure of the emulsion in a moist state and subsequent development, after said digestion and prior to reduction of soluble salt concentration, solarization is exhibited; and maintaining said substance in such concentration, despite reduction of soluble salts, as to produce a ratio of maximum to minimum reversal densities of at least 4 to 1 in the finished emulsion.

4. The process of producing a direct positive emulsion, comprising precipitating silver halide grains in a solution containing gelatin; including in said solution a soluble halide additional to said silver halide grains and capable, upon sufficient exposure to light, of destroying the developability of said grains; digesting said solution to permit said grains to grow in said solution in the presence of said soluble halide; the pH of said solution being not substantially higher than 7 during said precipitation and digestion; said soluble halide being present during said digestion in a concentration less than sufficient to cause coagulation and not less than .2 normal; and reducing the soluble salt concentration while maintaining said soluble halide in a concentration of at least .01 normal despite said reduction.

5. The process of producing a direct positive emulsion, comprising precipitating silver halide grains in a solution containing gelatin; including in said solution, a soluble halide additional to said silver halide grains and capable, upon sufficient exposure to light, of destroying the developability of said grains; digesting said solution to permit said grains to grow in said solution in the presence of said soluble halide; introducing into said emulsion prior to completion of said digestion a substance affording electro-positive ions for promoting intimate association of said soluble halide with said silver halide grains; the pH of said solution being not substantially higher than 7 during said precipitation and digestion; said soluble halide being present during said digestion in a concentration less than sufficient to cause coagulation but sufficiently high that upon exposure of the emulsion in a moist state and subsequent development, after said digestion, and prior to reduction of the soluble salt concentration, solarization is exhibited; and reducing the soluble salt concentration while maintaining said soluble halide in the emulsion in a concentration of at least .01 normal despite said reduction.

6. The process of producing a direct positive emulsion, comprising precipitating silver halide grains in a solution containing gelatin; including in said solution a soluble halide additional to said silver halide grains and capable, upon sufficient exposure to light, of destroying the developability of said grains; digesting said solution to permit said grains to grow in said solution in the presence of said soluble halide; the pH of said solution being not substantially higher than 7 during said precipitation and digestion; said soluble halide being present during said digestion in a concentration less than sufficient to cause coagulation of said grains but sufficiently high that upon exposure of the emulsion in a moist state and subsequent development, after said digestion, and prior to reduction of soluble salt concentration, solarization is exhibited; and reducing the soluble salt concentration while maintaining said soluble halide in the emulsion in a concentration of at least .01 normal despite said reduction; and thereafter digesting said emulsion to raise the maximum density to a desired value.

7. A photographic emulsion layer adapted upon exposure and development to produce a direct positive image, said emulsion including silver bromide grains capable of being rendered developable under the action of light, and a soluble halide capable, upon sufficient exposure to light, of destroying the developability of said grains, said soluble halide being present in the stage of grain formation in a concentration not less than .3 normal, and being retained in the finished emulsion, after reduction of soluble salt concentration, in a concentration not less than .01 normal.

8. A photographic emulsion layer adapted upon exposure and development to produce a direct positive image, said emulsion including silver chloride grains capable of being rendered developable under the action of light, and a soluble halide capable, upon sufficient exposure to light, of destroying the developability of said grains, said soluble halide being present in the stage of grain formation in a concentration not less than .2 normal, and being retained in the finished emulsion after reduction of soluble salt concentration, in a concentration not less than .01 normal.

9. A photographic emulsion layer adapted upon exposure and development to produce a direct positive image, said emulsion including silver halide grains capable of being rendered developable under the action of light, and a soluble halide capable, upon sufficient exposure to light, of destroying the developability of said grains, said soluble halide being present in the stage of grain formation in a concentration not less than .2 normal and being maintained, notwithstanding reduction of soluble salt concentration, in a concentration not less than .01 normal in the finished emulsion.

10. A photographic emulsion layer adapted upon exposure and development to produce a direct positive image, said emulsion including silver bromide grains capable of being rendered developable under the action of light, and a soluble halide capable, upon sufficient exposure to light, of destroying the developability of said grains, said soluble halide being present in the stage of grain formation in a concentration less than sufficient to cause coagulation of the grains, and not less than .3 normal, and being retained in the finished emulsion, after reduction of soluble salt concentration, in a concentration not less than .01 normal, the pH of said emulsion during the stage of grain formation being not substantially higher than 7.

11. A photographic emulsion layer adapted upon exposure and development to produce a direct positive image, said emulsion including silver chloride grains capable of being rendered developable under the action of light, and a soluble halide capable, upon sufficient exposure to light, of destroying the developability of said grains, said soluble halide being present in the stage of grain formation in a concentration less than sufficient to cause coagulation of the grains and not less than .2 normal, and being retained in the finished emulsion after reduction of soluble salt concentration, in a concentration not less than .01 normal, said emulsion being acidified during the stage of grain formation to a pH below 4.7.

GEORGE B. CROUSE.
FRANCIS A. HOLT.
JACOB L. JATLOW.